US010981554B2

(12) United States Patent
Adeeb et al.

(10) Patent No.: US 10,981,554 B2
(45) Date of Patent: Apr. 20, 2021

(54) FLUID DELIVERY SYSTEM

(71) Applicant: Caterpillar SARL, Geneva (CH)

(72) Inventors: Adam J. Adeeb, Seaham (GB); Steven Edward Johnson, Washington, IL (US); Anthony Joseph Weltzer, Cary, IL (US); Ernest Everett Stoops, Decatur, IL (US)

(73) Assignee: Caterpillar SARL, Geneva (CH)

( * ) Notice: Subject to any disclaimer, the term of this patent is extended or adjusted under 35 U.S.C. 154(b) by 108 days.

(21) Appl. No.: 15/985,920

(22) Filed: May 22, 2018

(65) Prior Publication Data

US 2018/0354485 A1 Dec. 13, 2018

(30) Foreign Application Priority Data

Jun. 7, 2017 (GB) .................................... 1709037

(51) Int. Cl.
*B60T 13/16* (2006.01)
*B60T 13/68* (2006.01)
(Continued)

(52) U.S. Cl.
CPC .............. *B60T 17/02* (2013.01); *B60T 8/173* (2013.01); *B60T 13/148* (2013.01); *B60T 13/16* (2013.01);
(Continued)

(58) Field of Classification Search
CPC ........ B60T 17/02; B60T 17/222; B60T 17/04; B60T 13/662; B60T 13/68; B60T 13/16; B60T 13/686; B60T 13/148; B60T 13/14; B60T 8/173; B60T 8/48; B60T 15/50; F04B 49/035; F04B 49/065; F04B 49/03; F04B 49/022; F04B 7/0073; F04B 23/02;
(Continued)

(56) References Cited

U.S. PATENT DOCUMENTS 4,590,763 A 5/1986 Augoyard et al.
5,183,127 A * 2/1993 Kageyama ......... B60G 17/0195
180/197
(Continued)

FOREIGN PATENT DOCUMENTS

JP 2005220530 A 8/2005

OTHER PUBLICATIONS

Search Report for related United Kingdom Application No. 1709037.4; dated Dec. 5, 2017.

*Primary Examiner* — Kenneth Rinehart
*Assistant Examiner* — Patrick C Williams (57) ABSTRACT

A system for delivering fluid in a machine is provided. The system includes a pump, a first valve disposed downstream of the pump, a check valve disposed downstream of the first valve, at least one accumulator disposed downstream of the check valve, and an auxiliary system disposed upstream of the check valve. The system further includes a control unit configured to receive a signal indicative of a fluid demand from the auxiliary system. The control unit is also configured to selectively control the first valve in a first position to limit flow of the fluid from the pump to the auxiliary system, and in a second position to allow flow of the fluid from the pump to the auxiliary system based, at least in part, on the received signal. The check valve limits flow of a fluid from the at least one accumulator to the auxiliary system.

12 Claims, 4 Drawing Sheets

(51) Int. Cl.

| | |
|---|---|
| *F04B 23/02* | (2006.01) |
| *B60T 13/66* | (2006.01) |
| *F04B 49/06* | (2006.01) |
| *F04B 7/00* | (2006.01) |
| *F04B 49/035* | (2006.01) |
| *B60T 17/02* | (2006.01) |
| *F04B 49/02* | (2006.01) |
| *B60T 13/14* | (2006.01) |
| *F04B 49/03* | (2006.01) |
| *B60T 8/173* | (2006.01) |
| *B60T 15/50* | (2006.01) |
| *B60T 17/04* | (2006.01) |
| *B60T 17/22* | (2006.01) |
| *F15B 1/027* | (2006.01) |

(52) U.S. Cl.
CPC ............ *B60T 13/662* (2013.01); *B60T 13/68* (2013.01); *B60T 13/686* (2013.01); *B60T 15/50* (2013.01); *B60T 17/04* (2013.01); *B60T 17/222* (2013.01); *F04B 7/0073* (2013.01); *F04B 23/02* (2013.01); *F04B 49/022* (2013.01); *F04B 49/03* (2013.01); *F04B 49/035* (2013.01); *F04B 49/065* (2013.01); *F15B 1/027* (2013.01); *F15B 2201/51* (2013.01); *F15B 2211/20553* (2013.01); *F15B 2211/61* (2013.01); *F15B 2211/611* (2013.01); *F15B 2211/625* (2013.01); *F15B 2211/6306* (2013.01)

(58) Field of Classification Search
CPC ................ F15B 1/027; F15B 2211/625; F15B 2211/611; F15B 2211/61; F15B 2211/20553; F15B 2211/6306; F15B 2211/51
See application file for complete search history.

(56) References Cited

U.S. PATENT DOCUMENTS

| | | |
|---|---|---|
| 5,700,070 A | 12/1997 | Sakai |
| 6,167,701 B1 | 1/2001 | Hatcher et al. |
| 2003/0182938 A1 | 10/2003 | Smith |
| 2005/0072144 A1* | 4/2005 | Bitter ...................... F15B 1/021 60/413 |
| 2006/0230751 A1 | 10/2006 | Huang et al. |
| 2010/0029440 A1* | 2/2010 | Burns ................... B60T 8/4872 477/171 |
| 2011/0146261 A1* | 6/2011 | Tevis ..................... E02F 9/2025 60/459 |
| 2011/0319227 A1* | 12/2011 | Kamada .............. F16H 61/0031 477/83 |
| 2015/0059860 A1 | 3/2015 | Horton et al. |
| 2016/0090715 A1 | 3/2016 | Wen et al. |
| 2018/0022334 A1* | 1/2018 | Bruett ................... B60T 8/3635 303/139 |

* cited by examiner

FLUID DELIVERY SYSTEM

TECHNICAL FIELD

The present disclosure relates to a fluid delivery system. More particularly, the present disclosure relates to the fluid delivery system associated with a machine.

BACKGROUND

A machine, such an articulated truck, having an auxiliary system, such as an automatic traction control, may employ a hydraulically operated cross axle differential. The differential may be powered by a hydraulic circuit associated with the machine. In some situations, a braking circuit employed for providing hydraulic power to hydraulically operated brakes of the machine may be employed for providing hydraulic power to the differential as well. Accordingly, the hydraulic circuit may employ one or more hydraulic accumulators, inverse shuttle valves, or the like.

In some situations, the differential may be hydraulically coupled to the hydraulic circuit upstream of the inverse shuttle valve and the hydraulic accumulators. Typically, a working pressure of the hydraulic accumulators may be substantially greater than a working pressure of the differential. As a result, during a pressure demand on the differential side, fluid under pressure may be delivered from the hydraulic accumulators to the differential through the inverse shuttle valve. As a result, the differential may induce a parasitic load on the hydraulic accumulators which may be primarily employed for powering the hydraulically operated brakes.

This may frequently trigger a low brake pressure warning in an operator console of the machine. Also, the inverse shuttle valve may be generally designed for allowing fluid flow there through in one direction, such as towards the hydraulic accumulators. As such, reverse flow of the fluid there through from the hydraulic accumulators towards the differential may result in vigorous movement of a valve element with respect to a valve seat of the inverse shuttle valve. This vibration may result in undesirable noise from the inverse shuttle valve, reduced valve life, and so on. Hence, there is a need for an improved system for providing hydraulic power to the auxiliary system of the machine.

U.S. Pat. No. 5,700,070 describes a vehicle brake control device for reducing noise and pulsation while securing a pressure boost during an anti-skid control and traction control. The brake control device includes a main brake line routed through a master cylinder, an inlet valve, and a wheel cylinder. An accumulator to store hydraulic pressure is installed in the brake line between the master cylinder and the wheel cylinder.

SUMMARY OF THE DISCLOSURE

In an aspect of the present disclosure, a system for delivering a fluid in a machine is provided. The system includes a pump configured to provide a flow of the fluid. The system includes a first valve in fluid communication with the pump and disposed downstream of the pump. The first valve is configured to move between a first position and a second position. The system includes a check valve in fluid communication with the pump and disposed downstream of the first valve. The system includes at least one accumulator in fluid communication with the pump and disposed downstream of the check valve. The system also includes an auxiliary system in fluid communication with the pump and disposed upstream of the check valve. The system further includes a control unit communicably coupled to the first valve and the auxiliary system. The control unit is configured to receive a signal indicative of a fluid demand from the auxiliary system. The control unit is also configured to selectively control the first valve in the first position to limit the flow of the fluid from the pump to the auxiliary system, and in the second position to allow the flow of the fluid from the pump to the auxiliary system based, at least in part, on the received signal. The check valve limits a flow of a fluid from the at least one accumulator to the auxiliary system.

In another aspect of the present disclosure, a method for providing a flow of a fluid in a machine is provided. The machine includes a pump, a first valve, a second valve, a third valve, a check valve, an auxiliary system, at least one accumulator, and a pressure sensor. The method includes receiving a signal indicative of a fluid demand from the auxiliary system. The method also includes selectively controlling the first valve in a first position to limit a flow of the fluid from the pump to the auxiliary system, and in a second position to allow the flow of the fluid from the pump to the auxiliary system based, at least in part, on the received signal. The check valve limits a flow of a fluid from the at least one accumulator to the auxiliary system.

Other features and aspects of this disclosure will be apparent from the following description and the accompanying drawings.

DETAILED DESCRIPTION

Figure 1:
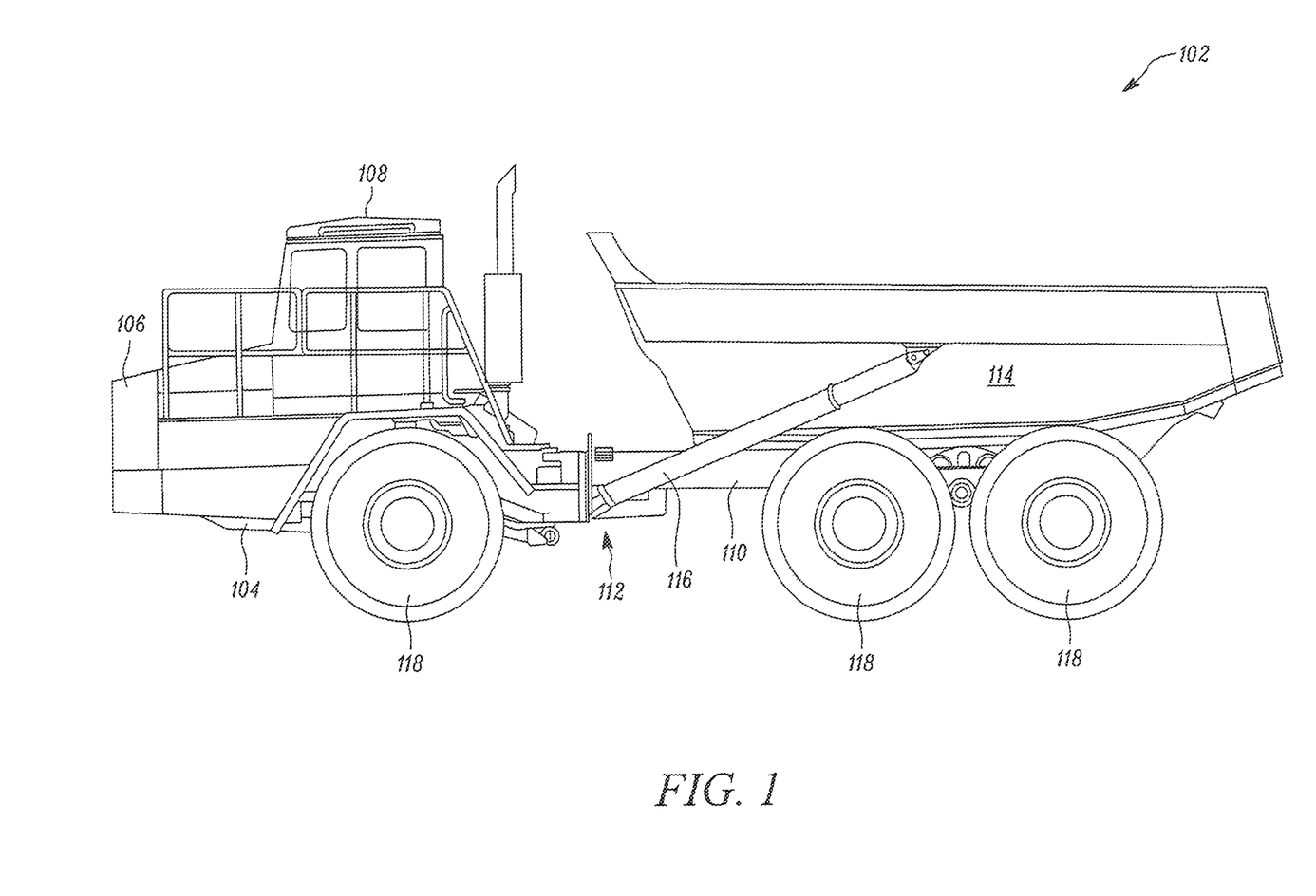
FIG. 1 is a side view of an exemplary machine, according to one embodiment of the present disclosure.

Wherever possible, the same reference numbers will be used throughout the drawings to refer to the same or the like parts. Referring to FIG. 1, an exemplary machine 102 is illustrated. More specifically, the machine 102 is an articulated truck. The machine 102 is adapted to transport material, such as ore, soil, rocks, and so on, from one location to another. In other embodiments, the machine 102 may be any other machine, such as a mining truck, an off-highway truck, a haul truck, and so on. The machine 102 may be related to an industry including, but not limited to, construction, transportation, mining, material handling, forestry, agriculture, and waste management.

The machine 102 includes a front frame 104. The front frame 104 is adapted to support various components of the machine 102. The machine 102 includes an enclosure 106 provided on the front frame 104. The enclosure 106 is adapted to house a power source (not shown) of the machine 102. The power source is adapted to provide power to the machine 102 for operational and mobility requirements. The power source may be any power source known in the art, such as an internal combustion engine, an electric motor, a battery, and so on. Additionally, the enclosure 106 may also include various components and systems of the machine 102, such as a transmission system, a drive control system, a lubrication system, an engine control system, a cooling system, an air supply system, and so on.

The machine 102 includes an operator cabin 108 mounted on the front frame 104. The operator cabin 108 is adapted to house one or more controls (not shown), such as a steering, a pedal, a lever, a control console, buttons, knobs, audio visual system, alarm system, and so on. The controls are adapted to operate and control the machine 102 on ground. The machine 102 also includes a rear frame 110. The rear frame 110 is coupled to the front frame 104 via an articulating joint 112. Accordingly, the front frame 104 may articulate with respect to the rear frame 110 via the articulating joint 112.

The machine 102 includes a load bed 114 provided on the rear frame 110. The load bed 114 is adapted to load and unload material therefrom for transporting the material from one location to another. The machine 102 also includes one or more hydraulic cylinders 116 coupled between the rear frame 110 and the load bed 114. The hydraulic cylinders 116 are adapted to tilt the load bed 114 during unloading of the material. The machine 102 further includes a set of wheels 118 mounted to the front frame 104 and the rear frame 110. The wheels 118 are adapted to support and provide mobility to the machine 102 on the ground.

Figure 2:
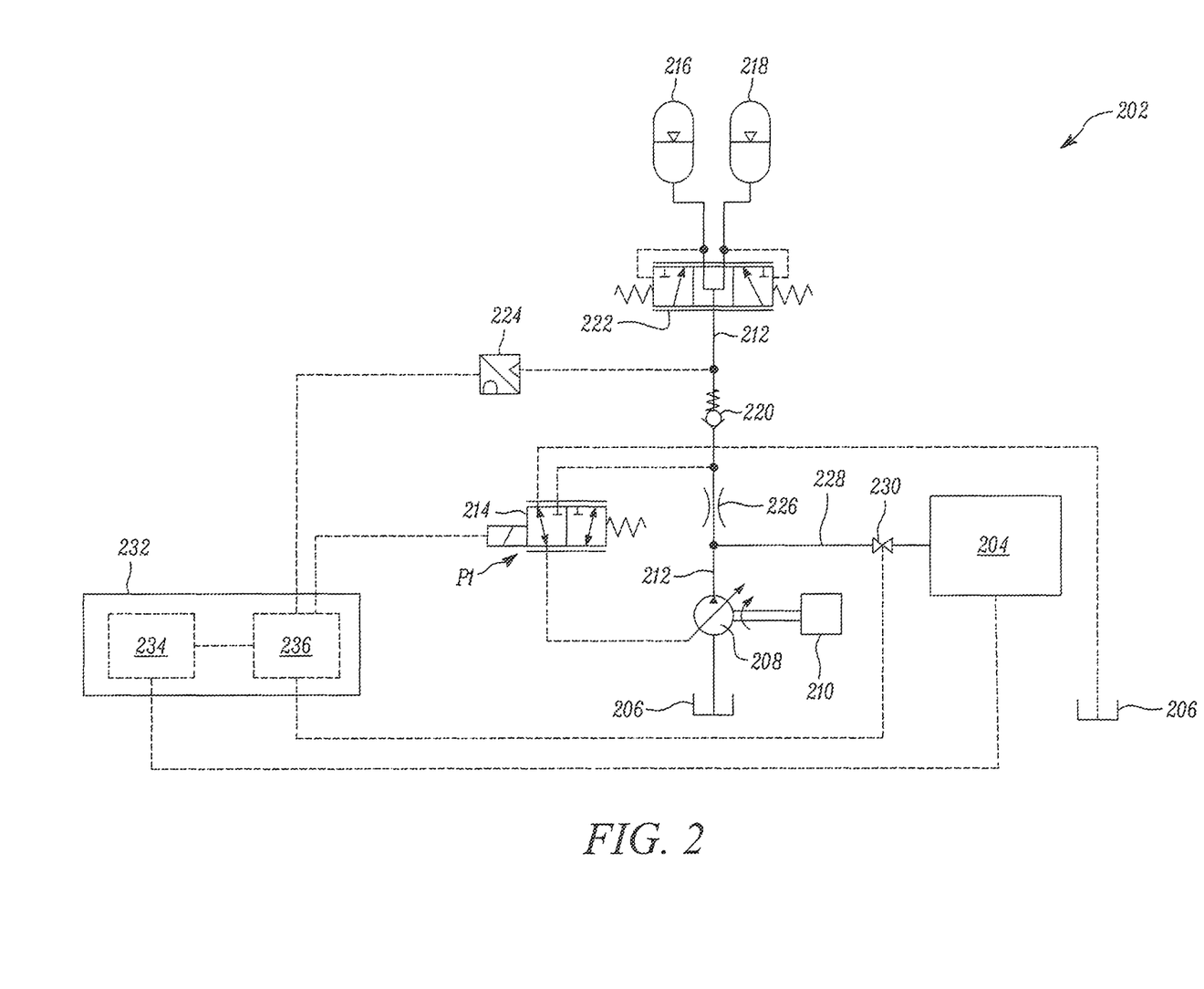
FIG. 2 is a schematic representation of a fluid delivery system associated with the machine of FIG. 1, according to one embodiment of the present disclosure.
Figure 3:
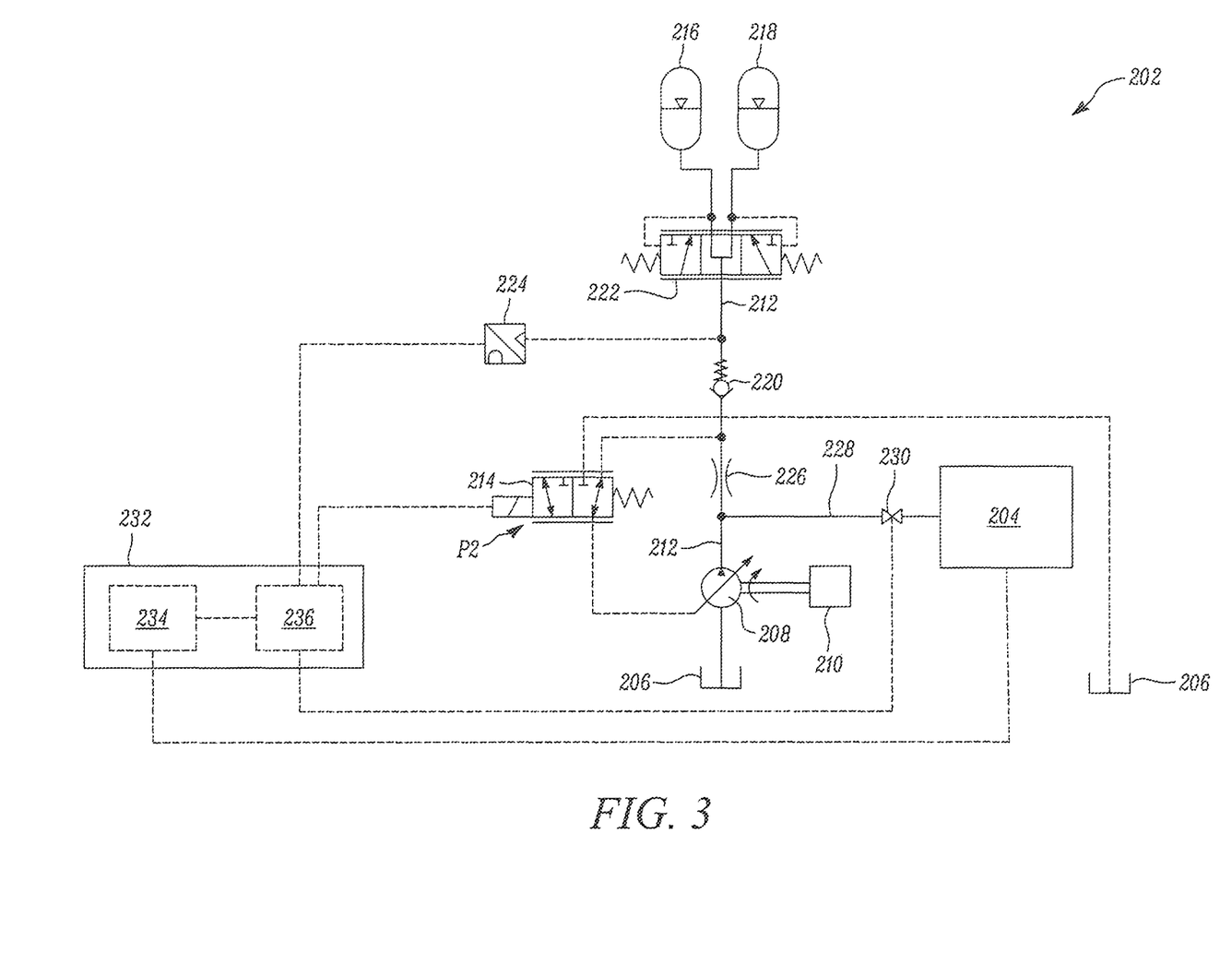
FIG. 3 is a schematic representation of a fluid delivery system associated with the machine of FIG. 1, according to another embodiment of the present disclosure.

Referring to FIGS. 2 and 3, a schematic representation of a fluid delivery system 202 for the machine 102 is illustrated. The fluid delivery system 202 will be hereinafter interchangeably referred to as the system 202. More specifically, the system 202 is adapted to deliver a fluid to one or more hydraulically operated brakes (not shown) associated with the set of wheels 118 of the machine 102. The system 202 is also associated with an auxiliary system 204 associated with the machine 102. The auxiliary system 204 may be any hydraulically operated system of the machine 102, such as an automatic traction control system employing a hydraulically operated cross axle differential, an automatic transmission employing a hydraulically operated clutch, and so on.

The system 202 includes a fluid sump 206. The fluid sump 206 is adapted to store the working fluid of the system 202 therein. In the illustrated embodiment, the fluid is hydraulic oil. In other embodiments, the fluid may vary based on application requirements including, but not limited to, brake oil, transmission oil, and engine oil. The system 202 includes a pump 208 in fluid communication with the fluid sump 206. The pump 208 is operably coupled to a motor 210. Accordingly, in the illustrated embodiment, the pump 208 is driven by the motor 210. In other embodiments, the pump 208 may be operably coupled to and driven by the engine.

In the illustrated embodiment, the pump 208 is a positive displacement pump, such as a piston pump. In other embodiments, the pump 208 may be any other pump known in the art, such as a variable displacement pump. The pump 208 is configured to receive the fluid from the fluid pump 208 and provide a flow of the fluid at a pressure through a main line 212 to various components of the system 202.

The system 202 includes a first valve 214 in fluid communication with the pump 208. More specifically, the first valve 214 is disposed in the main line 212 and downstream of the pump 208. The first valve 214 is configured to move between a first position "P1" (shown in FIG. 2) and a second position "P2" (Shown in FIG. 3). In the illustrated embodiment, the first valve 214 is a solenoid actuated hydraulic valve. In other embodiments, the first valve 214 may be any other hydraulic valve known in the art based on application requirements.

The system 202 includes a plurality of accumulators 216, 218 in fluid communication with the pump 208. In other embodiments, the system 202 may include a single accumulator or multiple accumulators based on application requirements. Each of the plurality of accumulators 216, 218 may be any hydraulic accumulator known in the art, such as a spring loaded accumulator, a gas or air charged accumulator, a piston type accumulator, a bellow type accumulator, and/or a combination thereof, and so on. Each of the plurality of accumulators 216, 218 is disposed in the main line 212 downstream of the pump 208. Each of the plurality of accumulators 216, 218 is configured to store the fluid delivered by the pump 208 under high pressure therein.

In the illustrated embodiment, each of the plurality of accumulators 216, 218 is associated with a braking circuit (not shown). The braking circuit may deliver the fluid under high pressure from one or more of the plurality of accumulators 216, 218 to one or more hydraulically operated brakes associated with the set of wheels 118. In other embodiments, one or more of the plurality of accumulators 216, 218 may be associated with any other system/component of the machine 102 based on application requirements.

The system 202 includes a check valve 220 in fluid communication with the pump 208. More specifically, the check valve 220 is disposed in the main line 212 and downstream of the first valve 214 and upstream of each of the plurality of accumulators 216, 218. The check valve 220 is configured to allow the flow of the fluid from the pump 208 to one or more of the plurality of accumulators 216, 218. Also, the check valve 220 is configured to limit a flow of the fluid from one or more of the plurality of accumulators 216, 218 to the pump 208. The check valve 220 may be any one way valve known in the art configured to allow the flow of the fluid in only one direction.

The system 202 includes a second valve 222 in fluid communication with the pump 208 and each of the plurality of accumulators 216, 218. More specifically, the second valve 222 is disposed in the main line 212 downstream of the check valve 220 and upstream of each of the plurality of accumulators 216, 218. In the illustrated embodiment, the second valve 222 is an inverse shuttle valve known in the art. Accordingly, the second valve 222 is configured to allow the flow of the fluid from the main line 212 into each of the plurality of accumulators 216, 218.

The second valve 222 is also configured to limit the flow of the fluid from each of the plurality of accumulators 216, 218 into the main line 212. The second valve 222 is further configured to limit a flow of the fluid from one or more of the plurality of accumulators 216, 218 into the fluid sump 206 during a failure of remaining one or more of the plurality of accumulators 216, 218.

The system 202 includes a pressure sensor 224 in fluid communication with each of the plurality of accumulators 216, 218. In the illustrated embodiment, the pressure sensor 224 is disposed in the main line 212 downstream of the check valve 220 and upstream of the second valve 222. In other embodiments, the pressure sensor 224 may be disposed at any location within the system 202 including, but not limited to, directly coupled to one or more of the plurality of accumulators 216, 218, based on application requirements. The pressure sensor 224 is configured to generate a signal indicative of a pressure of the fluid in each of the plurality of accumulators 216, 218. The pressure sensor 224 may be any pressure sensor known in the art including, but not limited to, a strain gauge type pressure sensor, a capacitive type pressure sensor, an electromagnetic type pressure sensor, a piezoelectric type pressure sensor, and an optical type pressure sensor.

The system 202 includes an orifice 226 in fluid communication with the pump 208. The orifice 226 is disposed downstream of the first valve 214 and upstream of the check valve 220. The orifice 226 is configured to provide a restriction in the main line 212 for the flow of the fluid from the pump 208 to each of the plurality of accumulators 216, 218. Accordingly, the orifice 226 limits pressure spike in the flow of the fluid from the pump 208 to each of the plurality of accumulators 216, 218. The orifice 226 may be any orifice known in the art, such as a fixed restriction orifice, a variable restriction orifice, and so on, based on application requirements.

The system 202 also includes the auxiliary system 204 in fluid communication with the pump 208. More specifically, the auxiliary system 204 is fluidly coupled to the main line 212 through an auxiliary line 228, The auxiliary line 228 and the auxiliary system 204 are disposed upstream of the check valve 220 and the orifice 226, Also, first valve 214 is disposed downstream of the auxiliary line 228 and the auxiliary system 204, The system 202 also includes a third valve 230 associated with the auxiliary system 204 and in fluid communication with the pump 208. The third valve 230 is disposed in the auxiliary line 228 and upstream of the auxiliary system 204.

The third valve 230 may be any valve known in the art including, but not limited to a ball valve, a gate valve, a globe valve, a diaphragm valve, and a multiway valve. In the illustrated embodiment, for explanation, the third valve 230 is shown as a separate component with respect to the auxiliary system 204. It should be noted that the third valve 230 may be an integral component of the auxiliary system 204 and may be located within limits of the auxiliary system 204. Also, the auxiliary system 204 may include multiple components (not shown) therein, such as one or more valves, fluid lines, couplings, sensors, and so on, based on application requirements. Also, it should be noted that a working pressure of the auxiliary system 204 may be substantially lower than a working pressure of each of the plurality of accumulators 216, 218.

The system 202 further includes a control unit 232. The control unit 232 is communicably coupled to the first valve 214, the pressure sensor 224, the auxiliary system 204, and the third valve 230. More specifically, in the illustrated embodiment, the control unit 232 includes a first controller 234 and a second controller 236. Each of the first controller 234 and the second controller 236 is communicably coupled to one another. Also, the first controller 234 is communicably coupled to the auxiliary system 204. Further, the second controller 236 is communicably coupled to the first valve 214, the pressure sensor 224, and the third valve 230.

It should be noted that the first controller 234 and the second controller 236 described herein are merely exemplary. In other embodiments, the system 202 may include a single controller, such as the control unit 232. In such a situation, functions of the first controller 234 and the second controller 236 may be performed by the control unit 232. The control unit 232, the first controller 234, and/or the second controller 236 may be any controller known in the art configured to perform one or more functions related to the system 202 and/or the machine 102. For example, the control unit 232, the first controller 234, and/or the second controller 236 may be an Engine Control Unit (ECU), a Machine Control Unit (MCU), a dedicated controller associated with the system 202 and configured to perform one or more functions thereof, and so on.

The first controller 234 is configured to receive a signal indicative of a fluid demand from the auxiliary system 204. The auxiliary system 204 may generate the signal indicative of the fluid demand based on one or more operating parameters including, but not limited to, slipping of one or more wheels 118, slipping of the clutch (not shown), loss of power delivery to one or more wheels 118, and reduced fluid pressure within the auxiliary system 204. Based on the received signal, the first controller 234 is configured to generate a signal indicative of controlling the first valve 214. Additionally, or optionally, the first controller 234 is also configured to generate a signal indicative of controlling the third valve 230.

Further, the second controller 236 is configured to receive the signal indicative of controlling the first valve 214 from the first controller 234. Based on the received signal, the second controller 236 is configured to control the first valve 214, selectively, in the first position "P1" to limit the flow of the fluid from the pump 208 to the auxiliary system 204, and in the second position "P2" to allow the flow of the fluid from the pump 208 to the auxiliary system 204 based, at least in part, on the received signal. Additionally, or optionally, the second controller 236 is also configured to receive the signal indicative of controlling the third valve 230 from the first controller 234.

Accordingly, the second controller 236 is configured to control the third valve 230, selectively, in a first position (not shown) to limit the flow of the fluid from the pump 208 to the auxiliary system 204, and in a second position (not shown) to allow the flow of the fluid from the pump 208 to the auxiliary system 204 based, at least in part, on the received signal indicative of the fluid demand from the auxiliary system 204. Also, the check valve 220 limits the flow of the fluid from each of the plurality of accumulators 216, 218 to the auxiliary system 204.

Further, the second controller 236 is also configured to receive the signal indicative of the pressure of the fluid in each of the plurality of accumulators 216, 218 from the pressure sensor 224. Based on the received signal, the second controller 236 is configured to control the first valve 214, selectively, in the first position "P1" to limit the flow of the fluid from the pump 208 to each of the plurality of accumulators 216, 218, and in the second position "P2" to allow the flow of the fluid from the pump 208 to the each of the plurality of accumulators 216, 218 based, at least in part, on the received signal.

In such a situation, the second controller 236 is also configured to control the third valve 230, selectively, in the first position to limit the flow of the fluid from the pump 208 to the auxiliary system 204, and in the second position to allow the flow of the fluid from the pump 208 to the auxiliary system 204 based, at least in part, on the received signal indicative of the fluid demand from the auxiliary system 204.

In the illustrated embodiment, in the first position "P1", each of the first valve 214 and the third valve 230 limits the flow of the fluid from the pump 208 in order to maintain a standby pressure within the system 202. More specifically, in the first position "P1", each of the first valve 214 and the third valve 230 allows a limited flow of the fluid there through in order to maintain the standby pressure or compensate for leakage within the system 202. In other embodiments, in the first position "P1", each of the first valve 214 and the third valve 230 may close in order to completely restrict the flow of the fluid there through. Further, in the second position "P2", each of the first valve 214 and the third valve 230 allows full flow of the fluid there through.

INDUSTRIAL APPLICABILITY

Figure 4:
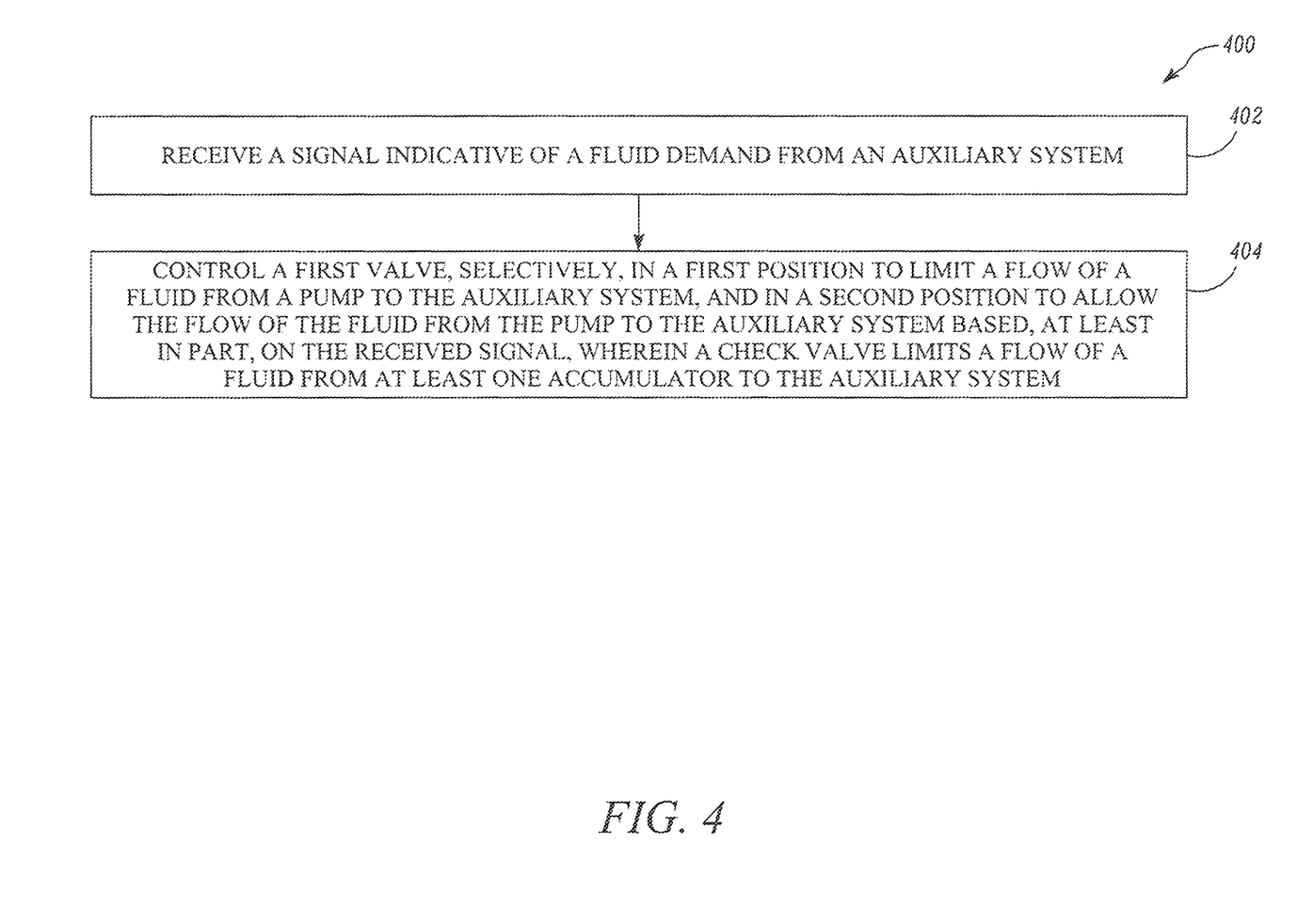
FIG. 4 is a flowchart of a method of working of the fluid delivery system of FIGS. 2 and 3, according to an embodiment of the present disclosure.

The present disclosure relates to a method 400 of working of the system 202. Referring to FIG. 4, a flowchart of the method 400 is illustrated. The method 400 will now be explained with reference to FIGS. 2, 3, and 4. At step 402, the control unit 232 receives the signal indicative of the fluid demand from the auxiliary system 204. At step 404, the control unit 232 controls the first valve 214, selectively, in the first position "P1" to limit the flow of the fluid from the pump 208 to the auxiliary system 204, and in the second position "P2" to allow the flow of the fluid from the pump 208 to the auxiliary system 204 based, at least in part, on the received signal.

Additionally, the control unit 232 also controls the third valve 230 in the first position to limit the flow of the fluid from the pump 208 to the auxiliary system 204, and in the second position to allow the flow of the fluid from the pump 208 to the auxiliary system 204 based, at least in part, on the received signal indicative of the fluid demand from the auxiliary system 204. Also, the check valve 220 limits the flow of the fluid from each of the plurality of accumulators 216, 218 to the auxiliary system 204.

For example, as shown in FIG. 2, during operation of the machine 102 when the system 202 may be in an idle state and/or there may be no fluid demand from the auxiliary system 204, the auxiliary system 204 generates a signal indicative of no fluid demand. Based on the signal indicative of no fluid demand, the control unit 232 controls the first valve 214 in the first position "P1". Accordingly, the first valve 214 limits the flow of the fluid from the pump 208 to the auxiliary system 204 through the main line 212 in order to maintain the standby pressure within the system 202.

Additionally, based on the signal indicative of no fluid demand, the control unit 232 also controls the third valve 230 in the first position. Accordingly, the third valve 230 limits the flow of the fluid from the pump 208 to the auxiliary system 204 through the auxiliary line 228 in order to maintain the standby pressure within the auxiliary system 204. In some embodiments, in the first position "P1", each of the first valve 214 and the third valve 230 may completely restrict the flow of the fluid there through respectively based on application requirements. Also, during the idle state or no fluid demand condition, the pressure of the fluid in each of the plurality of accumulators 216, 218 may be substantially higher than the standby pressure. As such, the check valve 220 limits the flow of the fluid from each of the plurality of accumulators 216, 218 to the auxiliary system 204 through the main line 212.

In another situation, as shown in FIG. 3, during operation of the machine 102 when there may be the fluid demand from the auxiliary system 204, such as during an activated state of the auxiliary system 204, the auxiliary system 204 generates a signal indicative of the fluid demand. Based on the signal indicative of the fluid demand, the control unit 232 controls the first valve 214 in the second position "P2". Accordingly, the first valve 214 allows the flow of the fluid from the pump 208 to the auxiliary system 204 through the main line 212 in order to provide a required flow rate and/or pressure of the fluid to the auxiliary system 204.

Additionally, based on the signal indicative of the fluid demand, the control unit 232 also controls the third valve 230 in the second position. Accordingly, the third valve 230 allows the flow of the fluid from the pump 208 to the auxiliary system 204 through the auxiliary line 228 in order to provide the required flow rate and/or pressure of the fluid to the auxiliary system 204. Also, during the fluid demand condition, the pressure of the fluid in each of the plurality of accumulators 216, 218 may be substantially higher than the required pressure of the fluid in the auxiliary system 204. As such, the check valve 220 limits the flow of the fluid from each of the plurality of accumulators 216, 218 to the auxiliary system 204 through the main line 212.

Further, as the auxiliary system 204 may be deactivated, the auxiliary system 204 generates the signal indicative of no fluid demand. Based on the signal indicative of no fluid demand, the control unit 232 controls the first valve 214 and the third in the first position "P1" respectively, and the cycle continues.

Additionally, the control unit 232 also receives the signal indicative of the pressure of the fluid in each of the plurality of accumulators 216, 218 from the pressure sensor 224. Based on the received signal, the control unit 232 controls the first valve 214, selectively, in the first position "P1" to limit the flow of the fluid from the pump 208 to one or more of the plurality of accumulators 216, 218, and in the second position "P2" to allow the flow of the fluid from the pump 208 to one or more of the plurality of accumulators 216, 218.

For example, as shown in FIG. 3, during operation of the machine 102 when the pressure of the fluid in one or more of the plurality of accumulators 216, 218 may be below a threshold, the pressure sensor 224 generates a signal indicative of low fluid pressure. Based on the signal indicative of the low fluid pressure, the control unit 232 controls the first valve 214 in the second position "P2". Accordingly, the first valve 214 allows the flow of the fluid from the pump 208 to one or more of the plurality of accumulators 216, 218 through the main line 212, the orifice 226, the check valve 220, and the second valve 222 in order to provide a required flow rate and/or pressure of the fluid to one or more of the plurality of accumulators 216, 218.

As the pressure of the fluid in one or more of the plurality of accumulators 216, 218 may be equal or greater than the threshold due to the flow of the fluid from the pump 208, the pressure sensor 224 generates a signal indicative of threshold or high fluid pressure. Based on the signal indicative of the high fluid pressure, the control unit 232 controls the first valve 214 in the first position "P1", as shown in FIG. 2. Accordingly, the first valve 214 limits the flow of the fluid from the pump 208 to one or more of the plurality of accumulators 216, 218 through the main line 212, the orifice 226, the check valve 220, and the second valve 222.

Further, in some situations, the control unit 232 may receive the signal indicative of the fluid demand from the auxiliary system 204 and the signal indicative of the low fluid pressure in one or more of the plurality of accumulators 216, 218 from the pressure sensor 224 simultaneously. In such a situation, the control unit 232 may simultaneously control the first valve 214 and the third valve 230 in order to provide the required flow rate and/or pressure of the fluid to the auxiliary system 204 and one or more of the plurality of accumulators 216, 218.

The fluid delivery system 202 provides a simple, efficient, and cost effective system for delivering fluid to each of the plurality of accumulators 216, 218 associated with the braking circuit, and/or the auxiliary system 204, such as the automatic traction control system. An arrangement of the auxiliary system 204 upstream of the check valve 220 limits draining of the fluid from each of the plurality of accumulators 216, 218 to the auxiliary system 204 during the fluid demand condition of the auxiliary system 204. This, in turn, reduces a parasitic load on each of the plurality of accumulators 216, 218. As such, each of the plurality of accumulators 216, 218 may be dedicatedly employed for providing hydraulic power to the braking circuit, thus, improving efficiency of the system 202.

Also, the arrangement of the check valve 220 upstream of each of the plurality of accumulators 216, 218 limits the flow of the fluid from each of the plurality of accumulators 216, 218 to upstream components, such as the fluid sump 206 and the auxiliary system 204, at all times. As a result, a reverse flow of the fluid through the second valve 222/the inverse shuttle valve is limited, in turn, resulting in limiting undesired valve noise, improving valve life, reducing replacement cost, and so on, due to the reverse flow there through. Further, the system 202 may be employed in any machine with little or no modification to the existing system.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of the disclosure. Such embodiments should be understood to fall within the scope of the present disclosure as determined based upon the claims and any equivalents thereof.

What is claimed is:

1. A system for delivering a fluid in a machine, the system comprising:
    a main line;
    a pump configured to provide a flow of the fluid via the main line;
    a first valve in fluid communication with the flow of fluid provided by the pump via a first fluid connection disposed in the main line downstream of the pump, wherein the first valve is configured to move between a first position and a second position;
    a check valve in fluid communication with the pump and disposed downstream of the first fluid connection to the first valve;
    at least one accumulator disposed downstream of the check valve to receive fluid from the pump via the main line, wherein the at least one accumulator is associated with a brake of the machine;
    an auxiliary system for receiving the flow of fluid from the pump via a second fluid connection disposed in the main line upstream of the check valve, wherein the auxiliary system comprises a traction control system employing a hydraulically operated cross axle differential; and
    a control unit communicably coupled to the first valve and the auxiliary system, and configured to:
        receive a signal indicative of a fluid demand from the auxiliary system; and
        control the first valve, selectively, in the first position to limit the flow of the fluid from the pump to the auxiliary system, and in the second position to allow the flow of the fluid from the pump to the auxiliary system based on the received signal, wherein the check valve limits a flow of a fluid from the at least one accumulator to the auxiliary system;
    a third valve arranged between the second fluid connection and the auxiliary system and communicably coupled to the control unit, wherein:
    a working pressure of the auxiliary system is lower than a working pressure of the at least one accumulator; and
    the third valve is configured to move in a first position to limit the flow of the fluid from the pump to the auxiliary system, and in a second position to allow the flow of fluid from the pump to the auxiliary system based on the received auxiliary fluid demand signal indicative of the fluid demand from the auxiliary system,
    an orifice disposed in the main line downstream of the second fluid connection to the auxiliary system and upstream of the check valve and the first fluid connection to the first valve; and
    a pressure sensor in fluid communication with the at least one accumulator and communicably coupled to the control unit, and configured to generate an accumulator pressure signal indicative of a pressure of the fluid in the at least one accumulator, wherein the control unit is further configured to:
        receive the signal indicative of the pressure from the pressure sensor; and control the first valve, selectively, in the first position to limit the flow of the fluid from the pump to the at least one accumulator, and in the second position to allow the flow of fluid from the pump to the at least one accumulator based on the received accumulator pressure signal.

2. The system of claim 1, wherein the control unit further includes a first controller communicably coupled to the auxiliary system, and configured to:
    receive the signal indicative of the fluid demand from the auxiliary system; and
    generate a signal indicative of controlling the first valve.

3. The system of claim 2, wherein the control unit further includes a second controller communicably coupled to the first valve and the first controller, and configured to:
    receive the signal indicative of controlling the first valve from the first controller; and
    control the first valve, selectively, in the first position to limit the flow of the fluid from the pump to the auxiliary system, and in the second position to allow the flow of the fluid from the pump to the auxiliary system based, at least in part, on the received signal, wherein the check valve limits the flow of the fluid from the at least one accumulator to the auxiliary system.

4. The system of claim 3, wherein the second controller is further communicably coupled to the pressure sensor, and configured to:
    receive the signal indicative of the pressure from the pressure sensor; and
    control the first valve, selectively, in the first position to limit the flow of the fluid from the pump to the at least one accumulator, and in the second position to allow the flow of the fluid from the pump to the at least one accumulator based on the received signal.

5. The system of claim 3, further including a second valve in fluid communication with the pump and the at least one accumulator, and disposed downstream of the check valve.

6. The system of claim 5, wherein the pressure sensor is disposed downstream of the check valve and upstream of the second valve.

7. The system of claim 5, wherein the at least one accumulator includes a plurality of accumulators fluidly coupled to the second valve.

8. The system of claim 5, wherein the second valve is an inverse shuttle valve.

9. The system of claim 3, wherein the third valve is communicably coupled to the second controller.

10. The system of claim 1, wherein the first valve is disposed downstream of the auxiliary system.

11. The system of claim 1, wherein the first valve is a solenoid actuated valve.

12. A method for providing a flow of a fluid in a machine, the machine including a pump, a first valve, a second valve, a third valve, a check valve, an auxiliary system comprising a traction control system employing a hydraulically operated cross axle differential, at least one accumulator associated with a brake of the machine, and a pressure sensor, the method comprising:

receiving an auxiliary fluid demand signal indicative of a fluid demand from the traction control system;

controlling the first valve, selectively, in a first position to limit the flow of the fluid from the pump to the auxiliary system, and in a second position to allow the flow of the fluid from the pump to the traction control system based on the received auxiliary fluid demand signal, wherein the check valve limits a flow of the fluid from the at least one accumulator to the auxiliary system;

selecting a working pressure of the traction control system to be lower than a working pressure of the at least one accumulator;

receiving an accumulator pressure signal indicative of a pressure in the at least one accumulator from the pressure sensor;

controlling the first valve, selectively, in the first position to limit the flow of the fluid from the pump to the at least one accumulator, and in the second position to allow the flow of the fluid from the pump to the at least one accumulator based on the received accumulator pressure signal; and controlling the third valve in a first position to limit the flow of the fluid from the pump to the auxiliary system, and in a second position to allow the flow of the fluid from the pump to the auxiliary system based on the received auxiliary fluid demand signal indicative of the fluid demand from the auxiliary system.

* * * * *